US006233466B1

United States Patent
Wong et al.

(10) Patent No.: US 6,233,466 B1
(45) Date of Patent: May 15, 2001

(54) DOWNLINK BEAMFORMING USING BEAM SWEEPING AND SUBSCRIBER FEEDBACK

(75) Inventors: Piu Bill Wong, Daly City; Shimon B. Scherzer, Sunnyvale, both of CA (US)

(73) Assignee: Metawave Communications Corporation, Redmond, WA (US)

( * ) Notice: Subject to any disclaimer, the term of this patent is extended or adjusted under 35 U.S.C. 154(b) by 0 days.

(21) Appl. No.: 09/289,774

(22) Filed: Apr. 8, 1999

Related U.S. Application Data (60) Provisional application No. 60/112,323, filed on Dec. 14, 1998.

(51) Int. Cl.[7] ........................................................ H04Q 7/00
(52) U.S. Cl. ........................ 455/562; 455/277.1; 370/342
(58) Field of Search ..................................... 455/450, 452, 455/62, 63, 67.1, 565, 561, 562, 277.1, 277.2, 278.1, 279.1; 370/310, 329, 341, 342

(56) References Cited

U.S. PATENT DOCUMENTS

| | | | |
|---|---|---|---|
| 5,303,240 | 4/1994 | Borras et al. | 370/95.3 |
| 5,434,578 | 7/1995 | Stehlik | 342/383 |
| 5,471,647 | 11/1995 | Gerlach et al. | 455/63 |
| 5,592,490 | 1/1997 | Barratt et al. | 370/310 |
| 5,634,199 | 5/1997 | Gerlach et al. | 455/63 |
| 6,104,930 | * 8/2000 | Ward et al. | 455/562 |
| 6,141,335 | * 10/2000 | Kuwahara et al. | 370/342 |

\* cited by examiner

Primary Examiner—Thanh Cong Le
(74) Attorney, Agent, or Firm—Fulbright & Jaworski L.L.P.

(57) ABSTRACT

A system and method is provided for adaptive downlink beamforming in a wireless communication system. The technique involves using an antenna array to transmit downlink control signals from the base station to the subscribers in the cell. Rather than transmitting the control signals in a given direction continuously, the control signals in the present system are transmitted for only a short time interval using one of a sequence of specified directional beams. After a predetermined sweep cycle period, the control signal beam is then retransmitted again in the same direction. Typically, during this cycle period control signal beams are also transmitted in other specified directions. In one embodiment, for example, the control signal beams sweep around the base station once during each cycle. A subscriber located in the cell will receive a repeating pattern of signal pulses corresponding to the periodic beams directed toward the subscriber. Because the sweeping beam pattern is known a priori, after a small number of sweeping cycle periods, the subscriber can easily estimate from the pattern of received signal pulses the optimal downlink beam or combination of beams. Techniques are provided that allow the optimal downlink beam to be estimated with angular resolution higher than the resolution of the sweeping beams. This optimal downlink beam information is then transmitted back to the base station, which uses it to transmit information to the subscriber using the optimal downlink beam, or combination of beams. Meanwhile, the subscriber continues to monitor the pattern of control beam pulses, and notifies the base station if the optimal downlink beam or beams changes.

14 Claims, 5 Drawing Sheets

FIG. 5F

DOWNLINK BEAMFORMING USING BEAM SWEEPING AND SUBSCRIBER FEEDBACK

This application claims priority from U.S. Provisional Patent Application No. 60/112,323 filed 12/14/98, which is incorporated herein by reference.

FIELD OF INVENTION

The present invention relates to wireless communication systems. More specifically, the invention relates to methods for adaptive spatial beamforming in the downlink of a cellular radio communications system.

BACKGROUND

Due to the increasing demand for wireless communication, it has become necessary to develop techniques for more efficiently using the allocated frequency bands, i.e., increasing the capacity to communicate information within a limited available bandwidth. In conventional low-capacity wireless communication systems, information is transmitted from a base station to subscribers by broadcasting omnidirectional signals on one of several predetermined frequency channels. Similarly, the subscribers transmit information back to the base station by broadcasting similar signals on one of the frequency channels. In this system, multiple users independently access the system through the division of the frequency band into distinct subband frequency channels. This technique is known as frequency division multiple access (FDMA).

A standard technique used by commercial wireless phone systems to increase capacity is to divide the service region into spatial cells. Instead of using just one base station to serve all users in the region, a collection of base stations are used to independently service separate spatial cells. In such a cellular system, multiple users can reuse the same frequency channel without interfering with each other, provided they access the system from separated spatial cells. The cellular concept, therefore, is a simple type of spatial division multiple access (SDMA). In order to allow the subscriber units to identify and communicate with separate cells, the base station for each cell continually broadcasts an omni-directional control signal to all users in the cell. This signal is traditionally transmitted on a special control channel and can contain various types of information for signal synchronization, control, etc.

In the case of digital communication, additional techniques can be used to increase capacity. A few well-known examples are time division multiple access (TDMA) and code division multiple access (CDMA). TDMA allows several users to share a single frequency channel by assigning their data to distinct time slots. CDMA is normally a spread-spectrum technique that does not limit individual signals to narrow frequency channels but spreads them throughout the frequency spectrum of the entire band. Signals sharing the band are distinguished by assigning them different orthogonal digital code sequences. CDMA is generally considered the most promising multiple access technique in the cellular telephone industry.

Despite the promise of CDMA, practical issues such as power control speed and inter-base station interference have limited system effectiveness in its initial phase of implementation. CDMA-based system capacity depends very much on the ability to provide for very accurate power control; but in a mobile environment, the signal may fluctuate too fast for the system to manage effective control. In addition, mobile wireless environments are often characterized by unstable signal propagation, severe signal attenuation between the communicating entities and co-channel interference by other radio sources. Moreover, many urban environments contain a significant number of reflectors (such as buildings), causing a signal to follow multiple paths from the transmitter to the receiver. Because the separate parts of such a multipath signal can arrive with different phases that destructively interfere, multipath can result in unpredictable signal fading. In addition, in order to provide service to shadowed areas, radiated power is increased, thereby increasing interference between base stations and significantly degrading overall system performance.

Recently, considerable attention has focused on ways to increase wireless system performance by further exploiting the spatial domain. It is well-recognized that SDMA techniques could, in principle, significantly improve the performance of a CDMA-based network. In practice, however, such significant improvements have yet to be realized. Current approaches are either simple but not very effective or effective but too complex for practical implementation.

One well-known SDMA technique provides the base station with a set of independently controlled directional antennas, thereby dividing the cell into separate fixed sectors, each controlled by a separate antenna. In order to allow the subscriber units to distinguish separate sectors in a cell, the base station continually broadcasts in each sector a fixed directional control signal that is unique to the sector. This technique allows subscribers in separate spatial sectors of the same cell to be spatially distinguished by the base station. As a result, the frequency reuse in the system can be increased and/or cochannel interference can be reduced. A similar but more complex technique can be implemented using a coherently controlled antenna array instead of independently controlled directional antennas to form fixed sectored beams. Using a signal processor to control the relative phases of the signals applied to the antenna array elements, predetermined downlink beams can be formed in the directions of the separate sectors. Similar signal processing can be used to selectively receive uplink signals only from within the distinct sectors. These sectoring techniques, however, only provide a relatively small increase in capacity compared to what is theoretically possible.

More sophisticated SDMA techniques have been proposed that theoretically could dramatically increase system capacity. For example, Gerlach et al. (U.S. Pat. No. 5,471,647 and U.S. Pat. No. 5,634,199) and Barratt et al. (U.S. Pat. No. 5,592,490) disclose wireless communication systems that increase performance by exploiting the spatial domain. In the downlink, the base station determines the spatial channel of each subscriber and uses this channel information to adaptively control its antenna array to form customized narrow beams. These beams transmit an information signal over multiple paths so that the signal arrives to the subscriber with maximum strength. The beams can also be selected to direct nulls to other subscribers so that cochannel interference is reduced. In the uplink, the base station uses the channel information to spatially filter the received signals so that the uplink signal is received with maximum sensitivity and distinguished from the signals transmitted by other subscribers. Through selective power delivery by intelligent directional beams, the interference between base stations can be reduced and the carrier-to-interference ratio at the base station receivers can be increased.

One of the most significant problems with these adaptive beamforming techniques is the computational complexity required to estimate the wireless air channel. In a typical base station that must simultaneously determine beams in real time for more than 100 subscriber units, the computational power required to implement the known techniques is presently beyond practical realization. Another problem with adaptive beam forming methods described in the art (e.g., U.S. Pat. No. 5,434,578) is that they deal only with uplink estimation. Downlink channel estimation, however, is a much more difficult problem. In particular, because the spatial channel is frequency dependent and the uplink and downlink frequencies are usually different, the uplink beamforming techniques do not provide the base station with sufficient information to accurately derive the downlink spatial channel information and improve system capacity.

For example, Borras et al. (U.S. Pat. No. 5,303,240) discloses a technique wherein a subscriber transmits a training signal in the uplink to a base station with an antenna array during a training mode. After the antenna array determines the beams corresponding to the best uplink reception during this training mode, the array then uses these beams for uplink and downlink beamforming. This technique, however, does not accurately measure correct downlink spatial beam information because the spatial channel is frequency dependent and the uplink and downlink frequencies are often different. The technique of Borras also suffers from the disadvantage that a separate training mode is required to determine the spatial channel. This approach has the disadvantage that the information transmission mode must be interrupted frequently to update the beam information whenever the propagation environment is not stable.

A technique for obtaining actual downlink channel information is to transmit probing signals and receive feedback from the subscriber, as taught by Gerlach et al. Gerlach's probing signals are omni-directional signals transmitted separately from the individual antennas in the array. The subscriber then detects the probing signals and determines the downlink spatial channel for each antenna. This downlink channel information is then sent back to the base station by the subscriber. In principle, the base station can then use the downlink channel information when transmitting downlink signals, thereby improving system performance. In practice, however, Gelach's technique has the significant problem that in typical environments where the propagation environment is changing, it requires very high feedback rates to transmit channel information for all the antennas.

There is a need, therefore, for downlink beamforming methods that overcome the limitations in the known approaches.

SUMMARY OF THE INVENTION

The present invention provides a method for wireless communication that adaptively exploits the spatial domain in the downlink without requiring computationally complex processing. Surprisingly, the method provides a technique for accurately estimating the downlink spatial channel while maintaining simplicity of implementation. In contrast with prior downlink beamforming techniques that assume the uplink and downlink spatial channels are identical, the present invention accurately estimates the downlink channel even when it differs significantly from the uplink channel. In addition, the present invention does not suffer from prohibitively large feedback rates, as do known techniques for estimating the downlink channel.

In one aspect of the invention, a method is provided for downlink beamforming in a wireless communication system. The technique involves using an antenna array to transmit downlink control signals from the base station to the subscribers in the cell. Unlike prior art systems in which the control signal in a given direction is transmitted continuously, the control signal in the present system is transmitted for only a short time interval in a specified directional beam. After a predetermined sweep cycle period, the control signal beam is then retransmitted again in the same direction. Typically, during this cycle period control signal beams are also transmitted in other specified directions. In one embodiment, for example, control signal beams sweep around the base station once during each cycle, similar to the operation of a lighthouse. Other patterns may also be used to achieve the same effect of alternately transmitting a sequence of control beams in distinct directional sectors of the cell during distinct time slots, so that the entire cell is covered by the collection of beams after a cycle period has passed. Thus, for the purposes of the present description, the term "sweeping" will be defined to apply to any complete covering of the cell by a sequence of beams, whether or not temporally successive beams are adjacent to each other. It is also important to note that the beams may have various shapes and may partially overlap with each other. In any case, however, each beam must have angular asymmetry, i.e., does not have an omni-directional power distribution. The beams must also be transmitted in distinct angular directions relative to the base station. Although the directions and beam patterns are preferably controlled electronically, other techniques may also be used for controlling the beams, e.g., mechanical rotation of an antenna platform.

In a preferred embodiment of the invention, the sweeping of the control signal beams over the cell is repeated indefinitely. As a result, a subscriber located in the cell will receive a repeating pattern of signal pulses. In an unobstructed signal propagation environment, there will be a peak pulse corresponding to the control beam directed toward the subscriber, and two or more weaker pulses corresponding to the beams directed slightly to one side or the other of the subscriber. Typical signal propagation environments, however, often are characterized by multipath effects. As a result, the peak pulse does not always correspond to the beam transmitted in the direction of the subscriber. In any case, the repeating pattern of control signal pulses received by the subscriber will be a function of both the transmitted sweeping beam pattern and the radio signal propagation environment. Because the sweeping beam pattern is known ba priori, after a small number of sweeping cycle periods, the subscriber can easily estimate from the pattern of received signal pulses the optimal downlink beam or combination of beams. This information is then transmitted back to the base station, which uses it to transmit information to the subscriber using the optimal downlink beam, or combination of beams. Meanwhile, the subscriber continues to monitor the pattern of control beam pulses, and notifies the base station if the optimal downlink beam or beams changes.

In one embodiment of the invention, all base station control signals are transmitted through the sequence of beams sweeping the sectors of the cell. In another embodiment of the invention, some of the control signals are transmitted continuously in all directions, or continuously in each fixed sector, while other control signals are transmitted as part of the sweeping beam. For example, during a specified time slot in the beam sweeping cycle, the control signal transmission from the base station is a superimposition of a directional beam containing primary control signals and an omni-directional signal containing secondary control signals. In other words, in the direction of the beam, there is additional radiant power injected (e.g., a few dB) for that time slot. As the beam sweeps, this extra power is injected in other directions, resulting in a sweeping of the primary control signal while the secondary signal is transmitted continuously in all directions. As before, the subscriber then receives control signal pulses corresponding to the beam sweeps, estimates optimal downlink beam information from the received pattern of pulses, and transmits this information to the base station for use in downlink information transmission. In addition, the subscriber continually monitors the pattern of control pulses and notifies the base station if the optimal beams for downlink transmission changes.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
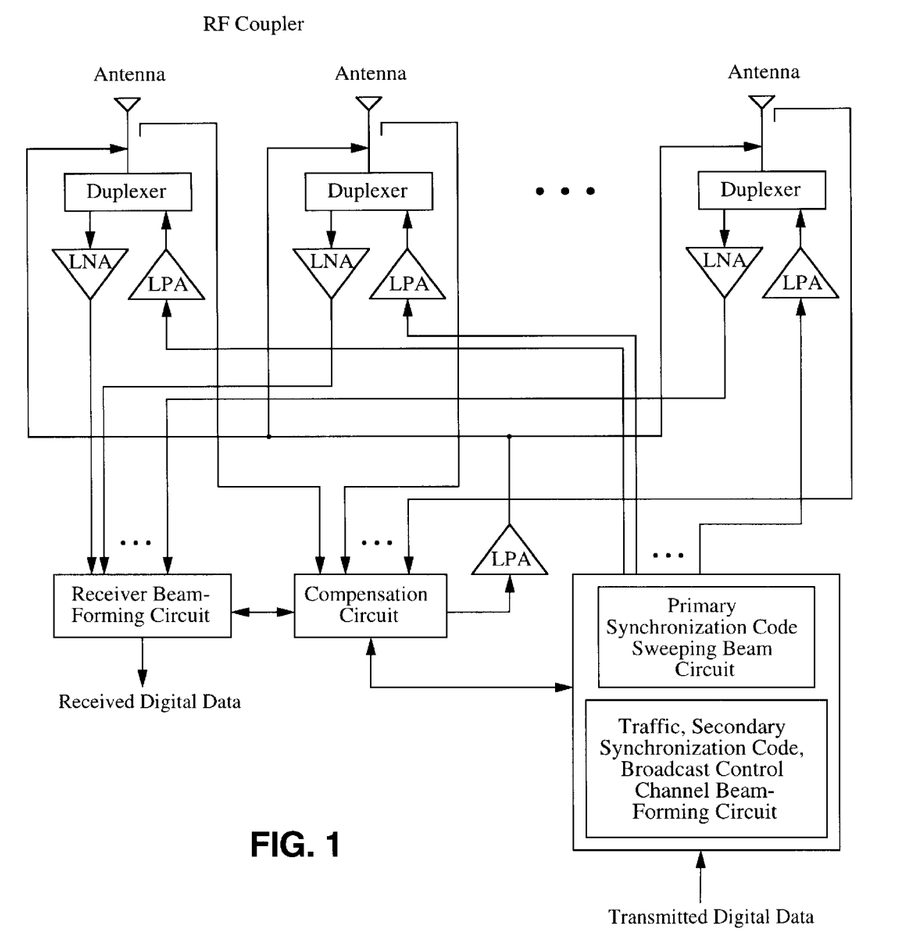
FIG. 1 provides a general view of the system architecture of a base station according to a preferred embodiment of the present invention.

FIG. 1 provides a schematic block diagram of a base station according to a preferred embodiment of the present invention. Although this embodiment will be described with reference to the proposed IMT-2000 cellular standard, the techniques of the present invention are applicable to various other standards as well. The base station comprises an antenna array having N antenna elements. Preferably, the number N of antenna elements is approximately 16 for a 360° cell. For cells having less than 360° coverage fewer antennas would be needed. In this embodiment, the N antenna elements are coupled to a corresponding set of N antenna duplexers that allow the array to be used for both transmission and reception, as is well known in the art. The embodiment allows for low cost duplexers and antenna filters since beam forming does not require high power per antenna element in order to provide the required effective radiated power (ERP).

The N antenna duplexers are coupled to a corresponding set of N low-noise amplifiers (LNAs) which amplify the signals received at the corresponding set of N antenna elements. The amplified signals from the LNAs are all coupled to a receiver beam-forming circuit, which spatially filters the uplink signals coherently received at the antenna array. The receiver beam-forming circuit also down-converts the incoming signals in frequency and digitizes them to produce received digital data.

In order to eliminate phase and amplitude mismatch in the multi-channel receiver, a compensation circuit is provided. The compensation circuit is coupled to the antenna array and measures the phase and amplitude response of each signal by embedding a sounding signal within the general data flow. This is performed without loosing sounding accuracy or interfering with the main data signal by ensuring that the sounding signal is either non-modulated or coded-spreaded, with statistical orthogonality to the data signal. A matched accumulator (using matched de-spreading code) on the channel output allows for coherent decoding of the sounding signal (to determine its phase and amplitude), while the data signal contribution to the detector output (being randomly distributed in phase and amplitude) is nullified. The measured phase and amplitude data are then used to generate signals that correct the analog channel response. These signals are sent from the compensation circuit through a low power linear power amplifier (LPA) to the antennas, as shown in the figure. The compensation circuit also provides improved performance in transmission from the array using a similar sounding technique.

The transmission control circuits produce signals that pass through N linear power amplifiers (LPAs) and then into the N duplexers. After passing through the duplexers, the signals are transmitted from the N antennas. The transmission control circuits comprise two main sections: the primary synchronization code sweeping beam circuit, and the traffic, secondary synchronization code, and broadcast control channel beamforming circuit. These circuits perform the signal processing and computations required to execute the methods of the invention, as will be described in detail below. The transmission control circuits also contain other conventional circuitry required for transmission of digital data comprising information signals intended for subscribers in the base station cell.

Figure 2A:
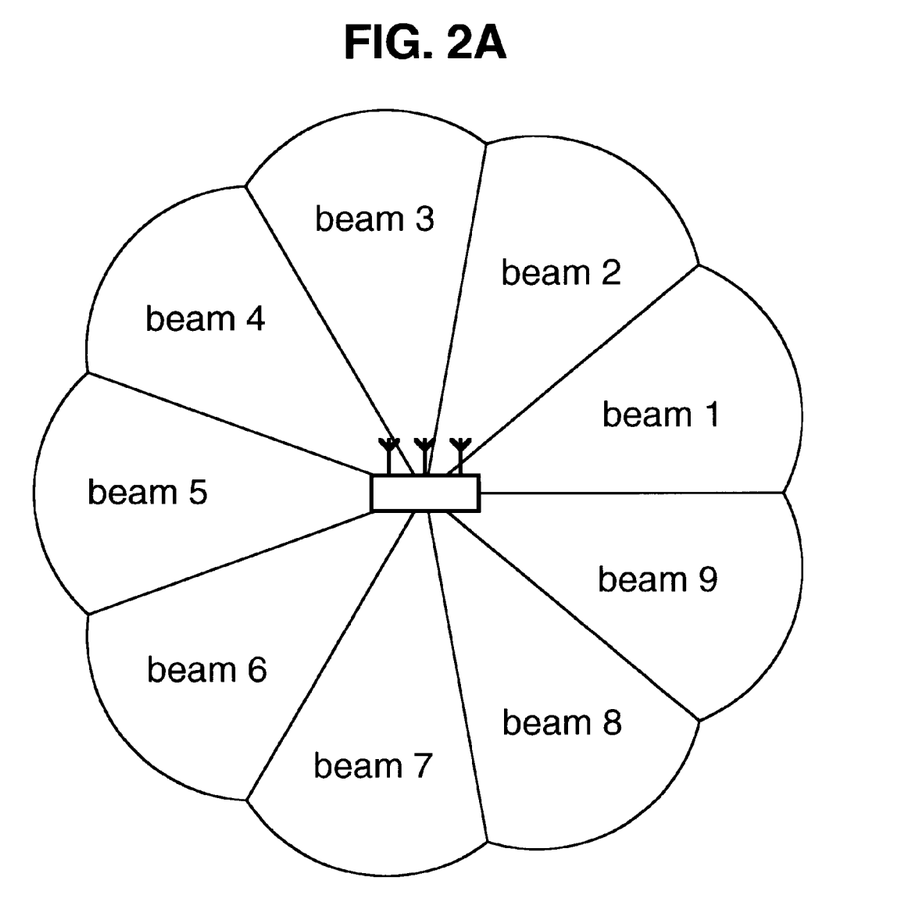
FIG. 2A illustrates an example of a sequence of non-overlapping control beams covering a base station cell according to an embodiment of the present invention.
Figure 2B:
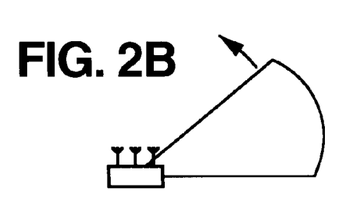
FIG. 2B illustrates a first beam used to transmit control channel information during a first time slot of a beam sweeping cycle, according to an embodiment of the present invention.
Figure 2C:
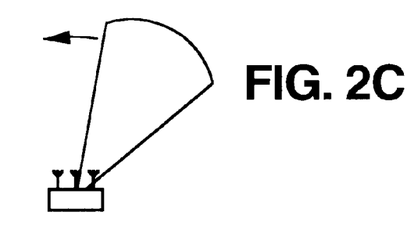
FIG. 2C illustrates a second beam used to transmit control channel information during a second time slot of a beam sweeping cycle, according to an embodiment of the present invention.

FIG. 2A illustrates an example of a sequence of non-overlapping control beams covering a base station cell. In this particular example, the cell is divided into nine sectors. Nine corresponding control signal beams are assigned to the sectors. The sweeping cycle period is similarly divided into nine time slots. According to one typical sweeping pattern, first beam 1 is used to transmit control channel information during a first time slot, as shown in FIG. 2B. At the end of the time slot, the beam 1 transmission is terminated and control channel information is transmitted during a second time slot using beam 2, as shown in FIG. 2C. In a similar manner, beams 3 to 9 are used during subsequent time slots to transmit control channel information, completing one sweep cycle. The sweep cycle is then repeated, just as before.

Figure 3:
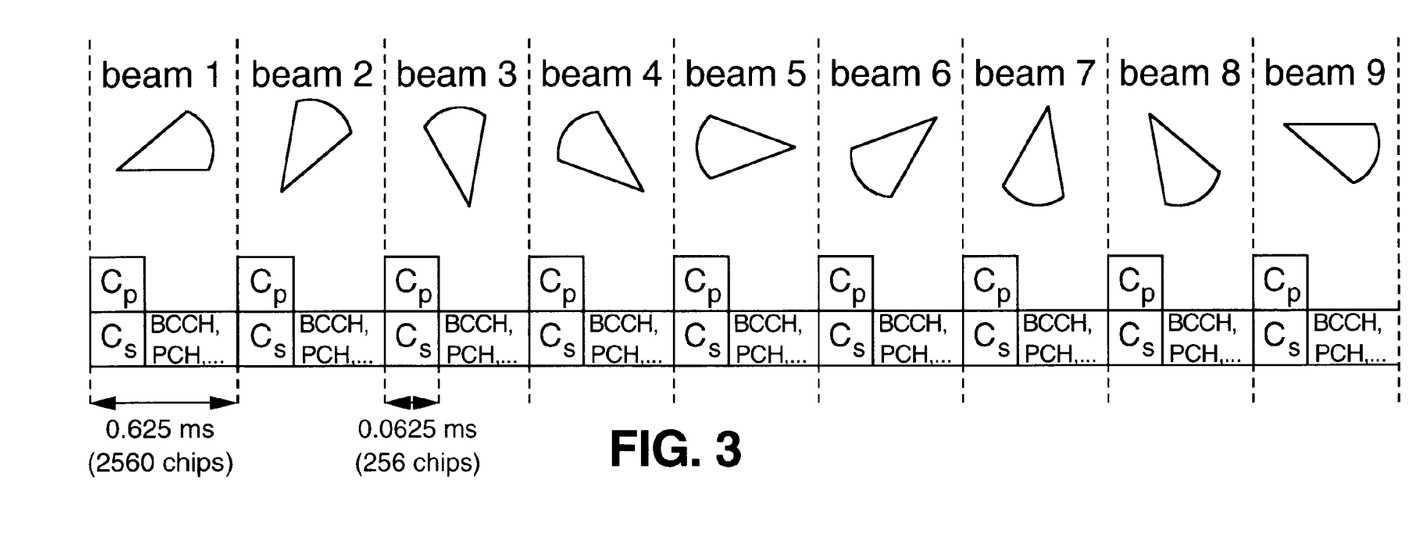
FIG. 3 is a diagram illustrating the timing of various transmissions during a sweeping cycle according to a preferred embodiment of the invention.
Figure 4A:
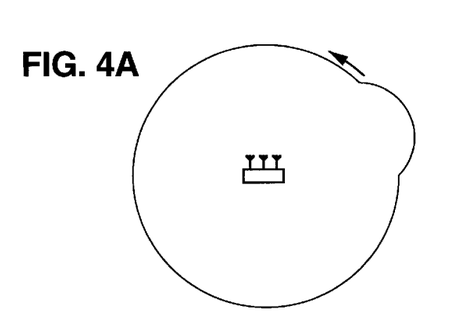
FIGS. 4A–4H show a sequence of antenna beam patterns generated by a base station during a sweep cycle according to an embodiment of the present invention.
Figure 4B:
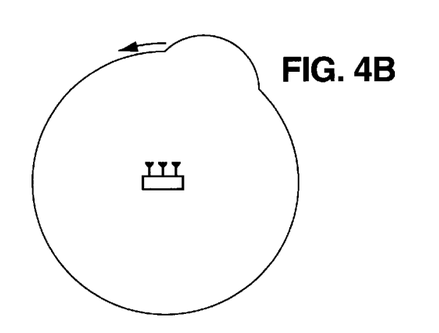
Figure 4C:
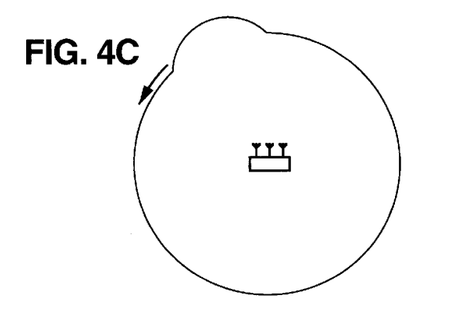
Figure 4D:
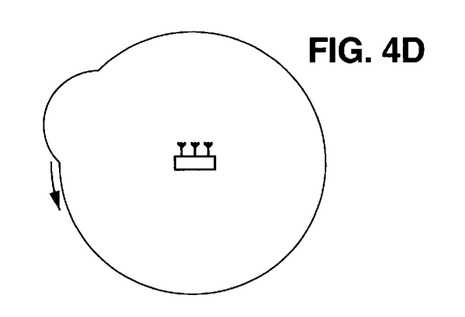
Figure 4E:
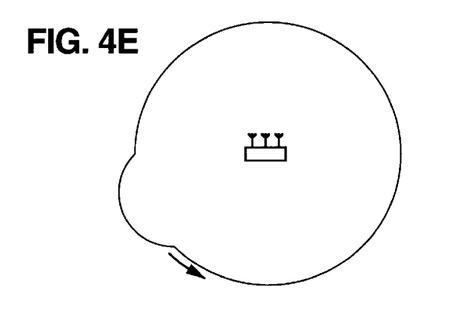
Figure 4F:
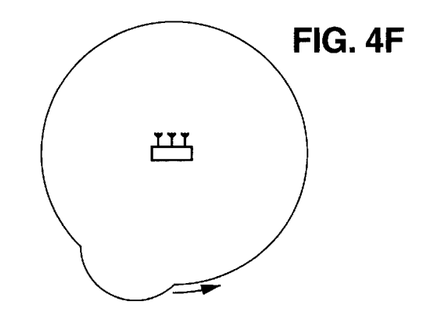
Figure 4G:
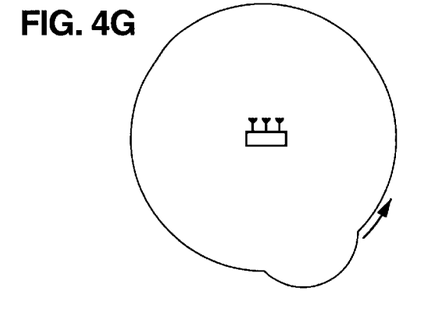
Figure 4H:
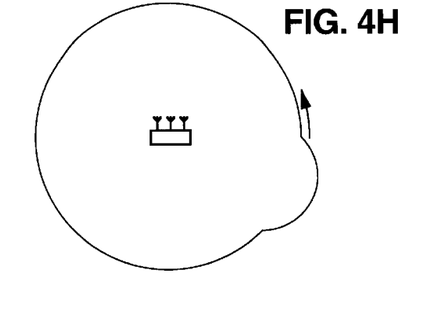

In one embodiment, each control signal beam is transmitted during a time slot lasting 0.625 ms, or 2560 chips, as shown in FIG. 3. The period of the total beam sweeping cycle is therefore 5.625 ms, which corresponds to a sweeping frequency of approximately 178 Hz. Preferably, the sweep frequency is in the range of 20–400 Hz. During each 0.625 ms time slot, the base station transmits a primary synchronization code ($C_p$), a secondary synchronization code ($C_s$), a broadcast control channel (BCCH), and a paging control channel (PCH). The primary and secondary synchronization codes ($C_p$ and $C_s$) are transmitted simultaneously during a short 0.0625 ms (256 chip) interval at the beginning of the time slot. The BCCH and PCH channel information is transmitted during the remainder of the time slot. The PCCH and PCH channel information is repeated in all the time slots.

In other embodiments, the BCCH and PCH channel information is broadcast continually in all directions, rather than during certain time slots and in certain directions. The secondary synchronization code can also be broadcast omni-directionally and continually. In any case, the primary synchronization code ($C_p$) is transmitted directionally as part of the sweeping beam. This primary code, which is used for time slot synchronization, is an unmodulated orthogonal Gold code that is 256 chips in length. The same $C_p$ code is retransmitted at the start of every time slot. The secondary synchronization code $C_s$ consists of an unmodulated orthogonal Gold code that is 4096 chips in length, i.e., 16 times longer than the $C_p$ code. The secondary synchronization code is divided into a sequence of 16 pieces, each 256 chips in length. This sequence is transmitted over 16 consecutive time slots, which defines a frame. The $C_s$ code is used for both frame synchronization and scrambling code determination.

In embodiments where the secondary code $C_s$ is transmitted as part of the sweeping beam, the subscriber receiver needs to receive the entire $C_s$ code in order to acquire frame synchronization. The 16 pieces of the $C_s$ code, however, are transmitted over consecutive time slots that correspond to consecutive beams in the sweeping cycle. The $C_s$ code, in other words, has its 16 pieces spread across a sequence of beams in the sweeping cycle. A subscriber located in one beam sector, therefore, may only receive one or two pieces of the $C_s$ code during one frame. Consequently, several sweeping cycles and several frames must be transmitted for the entire 16 pieces to be received by a single subscriberd. In order to ensure that each piece of the $C_s$ code is eventually transmitted to each beam in the cell, the number of beams (e.g., 9) and the number of $C_s$ pieces (e.g., 16) must be relatively prime, i.e., they must have a greatest common divisor of 1. In the case of $C_s$ with 16 pieces, for example, it suffices to select an odd number for the number of beams. The $C_s$ code pieces, of course, are received out of order. In the present example, after a total of 9 sweeping cycles, a subscriber in beam 1 will receive the 16 $C_s$ code pieces $C_{s1}$, ..., $C_{s16}$ in the following order: $C_{s1}$, $C_{s10}$, $C_{s3}$, $C_{s12}$, $C_{s5}$, $C_{s14}$, $C_{s7}$, $C_{s16}$, $C_{s9}$, $C_{s2}$, $C_{s11}$, $C_{s4}$, $C_{s13}$, $C_{s6}$, $C_{s15}$, $C_{s8}$. Having received all 16 pieces of the secondary code, the subscriber then acquires frame synchronization.

Although the beams discussed in the above example are shown to be non-overlapping, the actual beams are likely to be overlapped with adjacent beams. Moreover, each antenna beam will often have various side lobes extending into adjacent sectors. As described below, the present invention provides techniques for the subscriber to determine the optimal combination of downlink beams from the primary synchronization codes even when the beam patterns are overlapping and have side lobes. First, however, a technique is described for providing backward compatibility of the present invention with existing systems.

FIGS. 4A–4H show a sequence of antenna beam patterns generated by a base station during a sweep cycle according to another embodiment of the present invention. Each beam pattern can be considered as a superimposition of an omni-directional beam pattern and a highly directional beam pattern. In the sweep cycle, the omni-directional pattern remains constant while the directional beam moves successively through each of eight sectors covering the cell. Each of the eight beams is transmitted during one of the sweep cycle time slots. In this embodiment of the invention, only the primary synchronization codes used for time slot synchronization are transmitted using these patterns. The secondary synchronization codes, the paging channel, system broadcast channel, etc. are transmitted omni-directionally. This technique allows backward compatibility with subscribers that do not have sweep beam detection capability. As will be described in detail below, the subscribers with sweep beam detection capability only need the primary synchronization code to estimate the optimal downlink beams.

Although FIGS. 4A–4H show only 8 beam patterns in the sweep cycle used to transmit the primary synchronization codes, there is no limitation on the number of beam patterns or their directions. Note also that the highly directional portions of the beams may partly overlap with each other. The beam patterns may also have various different spatial power distributions than those shown. In general, the pattern of a single beam may have any distribution, provided only that it has some significant directional asymmetry. For example, FIGS. 5A–5F show six different possibilities for beam power distribution patterns. It will be appreciated that many other patterns are possible as well.

The following technique provides a method for the subscriber to determine an optimal downlink beam or combination of beams from the primary synchronization codes transmitted from the base station using the 8 beam patterns shown in FIGS. 4A–4H. Substantially identical techniques are used for other sweeping beam patterns. In the simplest implementation, the optimal downlink beam for data transmission is selected from the set of sweeping beams used for transmitting the control code sequences. In more sophisticated implementations, an optimal downlink beam is selected from a set of beams that is larger in number than the number of sweeping beams. In other words, an optimal beam direction can be determined with an angular resolution greater than the angle between sweeping beams. These more sophisticated methods can be applied to any of the beam sweeping techniques described above.

In one embodiment of the downlink beam determination method, the IMT-2000 proposal pilot signals (i.e., the primary synchronization codes) are used by the subscriber to determine the best downlink beam. More generally, however, any base station signals that are known a priori by the subscriber can be used to estimate the optimal downlink beam.

The techniques of the present invention, therefore, are not limited to the IMT-2000 proposal specifications.

Let $C_p(n)$ denote the primary synchronization code power received by the subscriber at time slot n, where n=0, 1, 2, 3, etc. Let h(n) denote a beam selection filter function. The simplest such function is defined by $h(n)=\delta(n)$, i.e., $h(n)=1$ if n=0 and $h(n)=0$ otherwise. More sophisticated beam selection filter functions that resemble the antenna patterns of the sweeping beams (i.e., antenna pattern match filters) can also be used to take advantage of the subscriber's a priori knowledge of the sweep beam patterns. The subscriber can store several predetermined beam selection filters, and/or receive the filters from the base station, either using the broadcast channels or by sending request messages. Using similar techniques, the subscriber can obtain other information about the sweep beam patterns, e.g., the number of beams per sweep cycle.

Now define the quantity $$CP(i, j) = \sum_{k=0}^{M-1} h(k - i)C_p(k + M \cdot j),$$

where j is the sweep cycle index, i is the index of the beam number in the sweep cycle, and M is the number of beams per sweep cycle. In the case where $h(n)=\delta(n)$, this equation simplifies to $CP(i,j)=C_p(i+M \cdot j)$, i.e., $CP(i,j)$ is simply the primary synchronization code power received by the subscriber during beam number i of sweep cycle j. Next define the average power of the $i^{th}$ beam over the past N sweeping cycles by $$\underline{CP}(i, j) = \frac{1}{N}\sum_{k=0}^{N-1} CP(i, j - k).$$

The value of N is chosen carefully so that it is large enough to average out the fast fading and is small enough to allow accurate determination of the current optimum downlink beam. Generally, the value of N is preferably selected to be as large as possible without introducing a significant chance that the subscriber has moved into another beam. The specific value for N, therefore, will depend upon the antenna beam widths, typical distance of the subscriber from the base station, sweeping cycle period, typical velocity of the subscriber, and other characteristics of the system. For example, suppose that the beam width is 30°, the sweeping cycle period is 7.5 ms, the number of beams is 12, the typical subscriber distance is 1.6 km, and the typical velocity of subscribers is 30 m/s. If one can tolerate 10° movement of the subscriber during the averaging, one can select N as large as 700 (corresponding to averaging over a 5.25 s time interval). A more conservative value for N in the range of 200–600 (i.e., 1.5 s–4.5 s) will still average out a significant amount of fast fading while providing higher confidence that the subscriber has not moved into another beam during the averaging.

The definition of $\underline{CP}(i,j)$ above can be interpreted as passing $CP(i,j)$ through a finite impulse response filter. Alternatively, one can define $\underline{CP}(i,j)$ using an infinite impulse response filter model:

$$\underline{CP}(i,j)=CP(i,j)+\beta\underline{CP}(i,j-1),$$

where β is a forgetting factor chosen to be larger than 0 and smaller than 1. Like the selection of N, the value of β is selected so that it is as large as possible without introducing a significant contribution from past values measured when the subscriber was in another beam. A reasonable choice of β is 0.98. It will be appreciated that various other formulas for $\underline{CP}(i,j)$ can be used to achieve a similar or equivalent effect as the two examples described above.

Figure 5A:
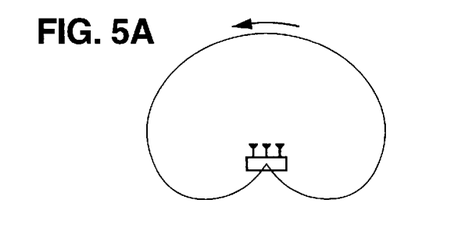
FIGS. 5A–5F show six different possibilities for sweeping beam power distribution patterns that might be used in various embodiments of the present invention.
Figure 5B:
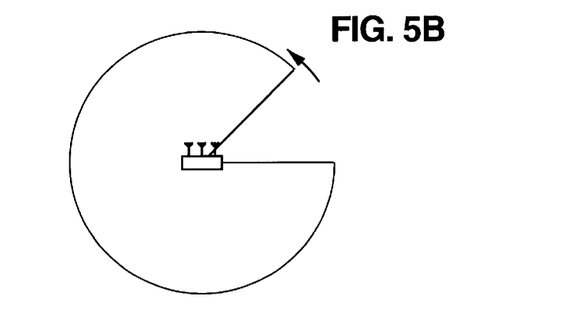
Figures 5C, 5D:
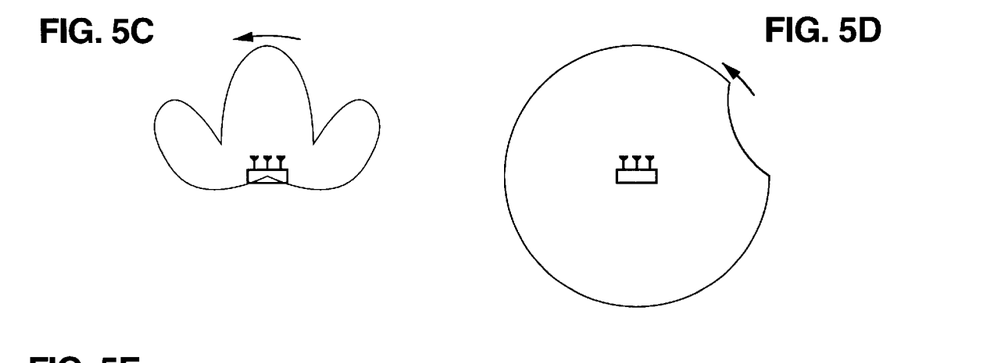
Figure 5E:
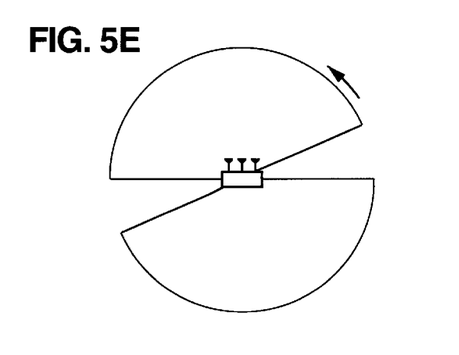
Figure 5F:
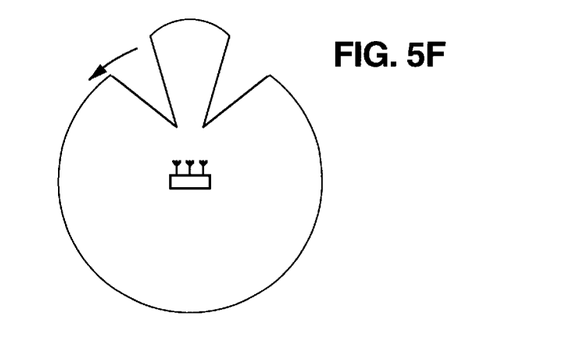

The optimal downlink beam at the end of a current sweeping cycle j, denoted DB(j), is selected by examining the set of average power values $\underline{CP}(1,j)$, $\underline{CP}(2,j)$, . . . , $\underline{CP}(M,j)$. If the beam power distribution pattern amplifies the total power in the beam direction, as shown in FIGS. 2 and 4, then DB(j) is selected by choosing the beam number that corresponds to the largest average power value in the set. That is, DB(j)=I, where $\underline{CP}(I,j)$=max {$\underline{CP}(i,j)$, i=1, . . . , M}. If the beam power distribution pattern attenuates the total power in the beam direction, as shown in FIGS. 5B and 5D, then the optimal downlink beam is selected by choosing the beam number that corresponds to the smallest average power value in the set. That is, DB(j)=I, where $\underline{CP}(I,j)$=min {$\underline{CP}(i,j)$, i=1, . . . , M}. This method of choice assumes that the beam selection filter function is $h(n)=\delta(n)$. In the case of using antenna pattern match filters such as beam selection filter functions, DB(j) is always selected by choosing the beam number that corresponds to the largest average power value in the set. That is, DB(j)=I, where $\underline{CP}(I,j)$=max { $\underline{CP}(i,j)$, i=1, . . . , M} for any type of antenna pattern as shown in FIGS. 2, 4 and 5.

Another approach to determine the optimum beam for downlink transmission is a histogram approach. First we find the maximum value or the minimum value of $CP(i,j)$ for i=1, . . . , M (i.e., find the optimum beam direction for each sweeping cycle). Whether the maximum or the minimum function should be used would depend on the type of beam selection filter function and the sweeping beam antenna pattern being used as described in the previous paragraphs. After N sweeping cycles, the beam direction that has been picked more times than any one of the rest of the beams is chosen as the optimum beam for downlink transmission. Alternatively, a low pass filter (e.g., a Hamming filter with 5 to 21 taps) can be used to filter the $CP(i,j)$ histogram data before the optimum direction (angle with the maximum value after filtering) is picked for downlink transmission.

The value of DB(j) estimated by the subscriber can be communicated to the base station in various ways. For example, after several sweeping cycles, the subscriber can determine the timing of the periodic beam pulses. This pulse timing information (e.g., a prediction of the specific time of the next beam pulse) is then sent from the subscriber to the base station over the current uplink active traffic channel, or other uplink channel. The pulse timing information is preferably sent to the base station only when the optimum downlink beam changes, i.e., when the value of DB(j) changes. Using this information, the base station can determine the beam that corresponds to the pulse timing information reported by the subscriber. The base station then forms an appropriate downlink beam for transmitting information signals to the subscriber. Note that this downlink beam does not necessarily have the same power distribution pattern as one of the sweeping beam patterns. Another way to communicate the DB(j) information to the base station is to use beam identification numbers. During the sweeping process, the base station transmits a unique beam identification number (BID) in the BCCH of each beam. The subscriber can decode this BID for each beam and send back to the base station the BID corresponding to the DB(j) value. Note that, although the DB(j) value is continually monitored by the subscriber, the DB(j) information need not be sent back to the base station unless its value changes.

The following techniques can be used to estimate the optimal downlink beams with angular resolution higher than the resolution of the sweeping beams. Thus, if we denote the number of downlink beam angles by $N_{angles}$, then $N_{angles}$>M. Consider a single beam in the sweeping sequence, and let SABP(n) denote the sweeping antenna beam pattern voltage amplitude in direction n, where n=0, . . . , $N_{angles}$−1. That is, SABP(n) is the beam's antenna voltage at the angle n·360°/$N_{angles}$. For example, suppose M=8 and the first beam in the sweeping sequence has an antenna beam pattern as shown in FIG. 5B. If $N_{angles}$=16, then we would have SABP(n)=0 for n=0, 1 and SABP=1 for n=2, . . . , 15.

Define the voltage pattern function VP(n) as the periodic extension of the function SABP(n). That is, VP(n) is defined for any integer n by VP(n)=SABP(n mod $N_{angles}$). Stated another way, if n=0, . . . , $N_{angles}$−1 then SABP(n)=VP(n+ k·$N_{angles}$) for all integers k. Now choose $N_{angles}$ so that it is an integral multiple of M, and redefine CP(i,j) at angle index i=0, . . . , $N_{angles}$−1 and sweep cycle j by.

$$CP(i, j) = \sum_{k=0}^{M-1} [C_p(k + M \cdot j)]^{1/2} VP(i - k \cdot N_{angles}/M)/\underline{VP}(i),$$

where $$\underline{VP}(i) = \left[\sum_{n=0}^{M-1} VP(i - n \cdot N_{angles}/M)^2\right]^{1/2}$$

is a power normalization factor.

This equation for CP(i,j) may be explained as follows. The subscriber will receive a unique power pattern if there is no multipath and if the sweeping beam pattern is carefully designed. Generally, however, there may be multipath. The system attempts to match the received voltage pattern (i.e., the square root of the power pattern) in one cycle to $N_{angles}$ sets of M angles separated by $N_{angles}$/M in a sweeping beam voltage pattern. One angle index i out of $N_{angles}$ angles should provide a best match, giving the maximum CP(i,j) value.

The subscriber can store several predetermined SABP(n) filters, and/or receive the filters from the base station, either using the broadcast channels or by sending request messages. The actual values of $N_{angles}$ and M can also be obtained through the similar fashion.

Now define the average power in the $i^{th}$ angular direction over the past N sweeping cycles by $$\underline{CP}(i, j) = \frac{1}{N}\sum_{k=0}^{N-1} CP(i, j-k),$$

or, alternatively, by $$\underline{CP}(i,j)=CP(i,j)+\beta \underline{CP}(i,j-1).$$

The criteria for selecting the values of N and β are the same as discussed before.

The optimal downlink beam angle at the end of a current sweeping cycle j, denoted DB(j), is selected by examining the set $\underline{CP}$(0,j), $\underline{CP}$(1,j), . . . , $\underline{CP}$($N_{angles}$−1,j). In particular, DB(j) is selected by choosing the beam angle index that corresponds to the largest average power value in the set. That is, DB(j)=I, where $\underline{CP}$(I,j)=max {$\underline{CP}$(i,j), i=0, . . . , $N_{angles}$−1}. Note that the optimal downlink spatial channel may include a combination of several downlink beam angles. In other words, multiple DB(j) values may be selected as those corresponding to several of the largest average power values. After this optimal downlink beam angle information is sent to the base station, it can then be used to transmit information to the subscriber on a specially adapted downlink beam. The beam may be selected from the multiple optimal beam angles, or may be selected to be a combination of the optimal beams.

Another approach to determine the optimum direction for downlink transmission is a histogram approach. First we find the maximum value of CP(i,j) for i=0, . . . , $N_{angles}$−1 (i.e., find the optimum direction for downlink transmission for every sweeping cycle). After N sweeping cycles, the angle direction that has been picked more times than any one of the rest of the beams is chosen as the optimum beam for downlink transmission. Or a low pass filter (e.g., a Hamming filter with 11 taps) can be used to filter the CP(i,j) histogram data before the optimum direction (angle with the maximum value after filtering) is picked for downlink transmission.

The optimal value(s) of DB(j) estimated by the subscriber can be communicated to the base station in various ways, just as described before. Note that, although the optimal DB(j) angle index value(s) are continually monitored by the subscriber, the DB(j) information need not be sent back to the base station unless it changes.

As is evident from the various embodiments illustrated above, the present invention encompasses within its scope many variations. Those skilled in the art will appreciate that additional modifications may also be made to the above embodiments without departing from the scope of the invention. Accordingly, the true scope of the present invention should not be construed as limited by the details provided above for the purposes of illustration, but should be determined from the following claims and their legal equivalents.

What is claimed is:

1. In a wireless communication system comprising a base station and at least one subscriber unit, a method for adaptive downlink beamforming, the method comprising:
   transmitting from an antenna array at the base station a temporal sequence of control signal beams, wherein the beams radiate from the antenna array in a set of distinct directional patterns, wherein each transmitted beam contains a distinct control signal synchronization code;
   receiving from the subscriber unit feedback signals containing downlink channel information for the sequence of control signal beams;
   determining a transmit beamforming channel from the downlink channel information; and
   adaptively transmitting from the antenna array information signals to the subscriber on the transmit beamforming channel.

2. The method of claim 1 wherein the feedback signals comprise beam timing information.

3. The method of claim 1 wherein the feedback signals comprise one or more beam identification numbers.

4. The method of claim 1 wherein the transmit beamforming channel is determined with an angular resolution higher than an angular resolution of the control signal beams.

5. The method of claim 1 wherein the temporal sequence of control signal beams is repeatedly transmitted from the antenna array, and wherein the receiving from the subscriber unit feedback signals takes place only when the downlink channel information changes.

6. The method of claim 1 wherein the control synchronization code comprises a primary synchronization code and a secondary synchronization code.

7. The method of claim 1 wherein the control synchronization code comprises a primary synchronization code, and wherein the method comprises continuously transmitting from the antenna array an omni-directional signal comprising a secondary synchronization code.

8. A wireless communications system base station for communicating with a plurality of subscriber units in a base station cell, the base station comprising:
   a) an antenna array for transmitting and receiving signals to and from the subscriber units in the base station cell;
   b) a radio transmitter connected to the antenna array for producing the signals transmitted to the subscriber units by the antenna array;
   c) a radio receiver connected to the antenna array for detecting the signals received from the subscriber units by the antenna array; and d) a base station signal processor connected to the transmitter and receiver for controlling the transmitter and receiver;

wherein the transmitter, under control of the signal processor, produces a temporal sequence of control signal beams transmitted by the antenna array to the subscriber units, where the temporal sequence of control signal beams sequentially radiates the cell in a set of distinct directional patterns with control signal synchronization codes;

wherein the receiver, under control of the signal processor, detects feedback signals from the subscribers, where the feedback signals contain downlink channel information for the sequence of control signal beams;

wherein the transmitter, under control of the signal processor, uses the downlink channel information to adaptively transmit information signals to the subscribers over customized spatial channels.

9. The method of claim 8 wherein the feedback signals comprise beam timing information.

10. The method of claim 8 wherein the feedback signals comprise one or more beam identification numbers.

11. The method of claim 8 wherein the customized spatial channels are determined with an angular resolution higher than an angular resolution of the control signal beams.

12. The method of claim 8 wherein the temporal sequence of control signal beams is repeatedly transmitted from the antenna array, and wherein the receiver detects feedback signals only when the downlink channel information changes.

13. The method of claim 8 wherein the control synchronization code comprises a primary synchronization code and a secondary synchronization code.

14. The method of claim 8 wherein the control synchronization code comprises a primary synchronization code, and wherein the transmitter continuously transmits from the antenna array an omni-directional signal comprising a secondary synchronization code.

\* \* \* \* \*